G. F. J. Colburn's
New Case for Tooth Paste
73953
PATENTED
FEB 4 1868
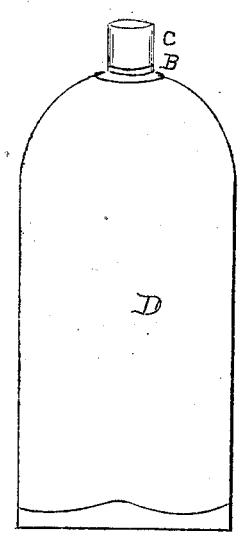
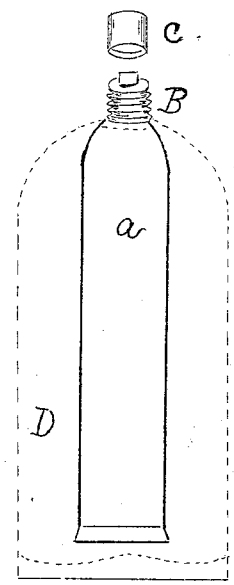
Witness
Horace Harris
A. G. P. Colburn
Inventor
G. F. J. Colburn

UNITED STATES PATENT OFFICE.

G. F. J. COLBURN, OF NEWARK, NEW JERSEY.

IMPROVED CASE FOR TOOTH-PASTE.

Specification forming part of Letters Patent No. 73,953, dated February 4, 1868.

*To all whom it may concern:*

Be it known that I, GEO. F. J. COLBURN, of Newark, in the county of Essex and State of New Jersey, have invented a new and Improved Case for Tooth-Paste; and I do hereby declare that the following is a full and exact description of the same, reference being had to the accompanying drawings and to the letters of reference marked thereon.

My invention consists in providing for the use of tooth-pastes in a simple and convenient manner; and the device I employ is a small tube or sack, A, made of tin-foil or some other substance impervious to water or oils. This sack is made with a tube, B, at one end and a cap, C, screwed onto the tube. The sack is filled with the paste in a proper condition for use, and the cap keeps it in its place. When desired for use the cap is removed, and a slight pressure upon the sack will cause the paste to come out from the tube, whence it may be taken for use on the brush or otherwise. I inclose this sack in a case, D, of leather, cloth, or similar material, for the purpose of protecting it for carrying in the pocket or a traveling-bag; or the case may be made of some material like leather or cloth, made impervious and strong and made with a tube and cap, in which the paste is put and from which it is used without the extra sack inside of it.

I am persuaded that the best mode of using a dentifrice is in the form of a paste; but the use of pastes has been difficult and unpleasant, as no convenient receptacle has hitherto been found for its use; but this device provides for avoiding the waste and uncleanliness in the use of powders, and also in the use of pastes in any other mode before employed.

I am aware that this style of sack and tube is not new, as it is used for paints; but for a tooth-paste it is believed to be new and really desirable. Especially it is believed it will be found new in the arrangement as or with a case. The application therefore of the sack and tube to the purpose of conveniently using a tooth-paste, and the combination of the case for the purpose of protection make it a desirable invention, and as such to be entitled to the protection of a patent for the benefit of the inventor.

I claim—

The case D, to be used in combination with the tube B, and with or without the sack A, and the application of the whole as and for the purpose specified.

G. F. J. COLBURN.

Witnesses:
 HORACE HARRIS,
 A. G. P. COLBURN.